United States Patent [19]
Craver

[11] Patent Number: 4,777,481
[45] Date of Patent: Oct. 11, 1988

[54] DISPLAY PROCESSOR FOR IMAGE DATA WITH NON-CONSTANT PIXEL SIZE FOR CHROMATIC VALUES

[75] Inventor: Thomas R. Craver, Cranbury, N.J.
[73] Assignee: Technology Inc. 64, Princeton, N.J.
[21] Appl. No.: 20,638
[22] Filed: Mar. 2, 1987
[51] Int. Cl.⁴ ............................................. G09G 1/28
[52] U.S. Cl. ................................... 340/703; 340/799; 358/21 R
[58] Field of Search ................... 358/12, 13, 21 R, 22; 340/703, 798, 799

[56] References Cited
U.S. PATENT DOCUMENTS

| | | | |
|---|---|---|---|
| 4,490,797 | 12/1984 | Staggs et al. | 364/522 |
| 4,496,944 | 1/1985 | Collmeyer | 340/723 |
| 4,520,358 | 5/1985 | Makino | 340/799 |
| 4,654,696 | 3/1987 | Dayton et al. | 358/12 |
| 4,660,073 | 4/1987 | Baumeister | 358/21 R |

Primary Examiner—John W. Shepperd
Attorney, Agent, or Firm—Eugene M. Whitacre; Paul J. Rasmussen; Eric P. Herrmann

[57] ABSTRACT

The invention is embodied in a system comprising image memory and a display processor that automatically processes video data which alternate between having chrominance pixels of greater area than luminance pixels and having chrominance pixels of the same area as luminance pixels. Subsamples describing chrominance pixels of greater size are time-division-multiplexed with samples describing pixels in the image memory output when the former type of processing is done. Whichever format for video data is currently being used, the channel for reading subsamples from image memory to the display processor is used to transmit flag data controlling the mode of processing of video data performed by the video processor.

19 Claims, 5 Drawing Sheets

DISPLAY PROCESSOR FOR IMAGE DATA WITH NON-CONSTANT PIXEL SIZE FOR CHROMATIC VALUES

The present disclosure relates to display processors used as buffers between digital memories and display devices such as kinescopes.

BACKGROUND OF THE INVENTION

In kinescope displays drawn from computer memory that describe graphics, the practice is to sample both the luminosity and the chromaticity of the same picture elements ("pixels"). This is done to maintain high resolution edges in chrominance signal components as well as in luminance signal components. Since luminance and chrominance are sampled with equal spatial densities, the video data is stored in the form of pixel descriptors for successive pixels in raster scan, each descriptor containing both luminance and chrominance information concerning a particular pixel. These descriptors may be stored in a bit-map-organized format or in a run-length format, for example. These pixel descriptors may comprise luminance and chrominance signal components per se. But often these pixel descriptors are pointer data applied as read addresses to color map memories that store luminance and chrominance signal components in their addressed storage locations.

In kinescope displays based on camera-originated video, a practice has been to use narrower spatial bandwidths for chrominance than for luminance. A computer memory for storing such video in digital sampled-data form may sample luminance signal more densely than chrominance signal in the direction of line advance in the raster scan as well as in the direction of pixel scanning along a raster line. In effect, then, one chrominance pixel takes up the same area on the display screen as a rectangular array of smaller-area luminance pixels. Such systems particularly well-suited to storing luminance and chrominance data in a video random-access memory (VRAM) with serial output port are described in detail by D. L. Sprague, N. Fedele and L. D. Ryan in U.S. Pat. No. 4,740,832, filed Oct. 14, 1986, entitled "IMAGE STORAGE USING SEPARATELY SCANNED LUMINANCE AND CHROMINANCE VARIABLES" and assigned to RCA Corporation. In these systems, to accommodate the difference in luminance and chrominance signal sampling densities, luminance and chrominance are stored in separate bit-map-organized portions of the video random-access memory. The samples of luminance signal are read from VRAM serial output port on a real-time basis during line trace intervals. The samples of chrominance signal are read from VRAM serial output port on a compressed-and-advanced-in-time basis during line retrace intervals. The chrominance signal is retimed and is resampled in an interpolation process supported by rate-buffering line stores, to generate a new set of chrominance samples in suitable temporal relationship with related luminance samples.

SUMMARY OF THE INVENTION

The invention is embodied in a system comprising image memory and a display processor that automatically processes video data which alternate between having chrominance pixels of greater area than luminance pixels and having chrominance pixels of the same area as luminance pixels. Subsamples describing chrominance pixels of greater size are multiplexed with samples describing luminance pixels in the image memory output when the former type of processing is done. Whichever format for video data is currently being used, subsamples are read from image memory to the display processor to provide flag data that describe the coding standard for the image data currently being processed and control the mode of processing of video data performed by the video processor.

DETAILED DESCRIPTION

Figure 1:
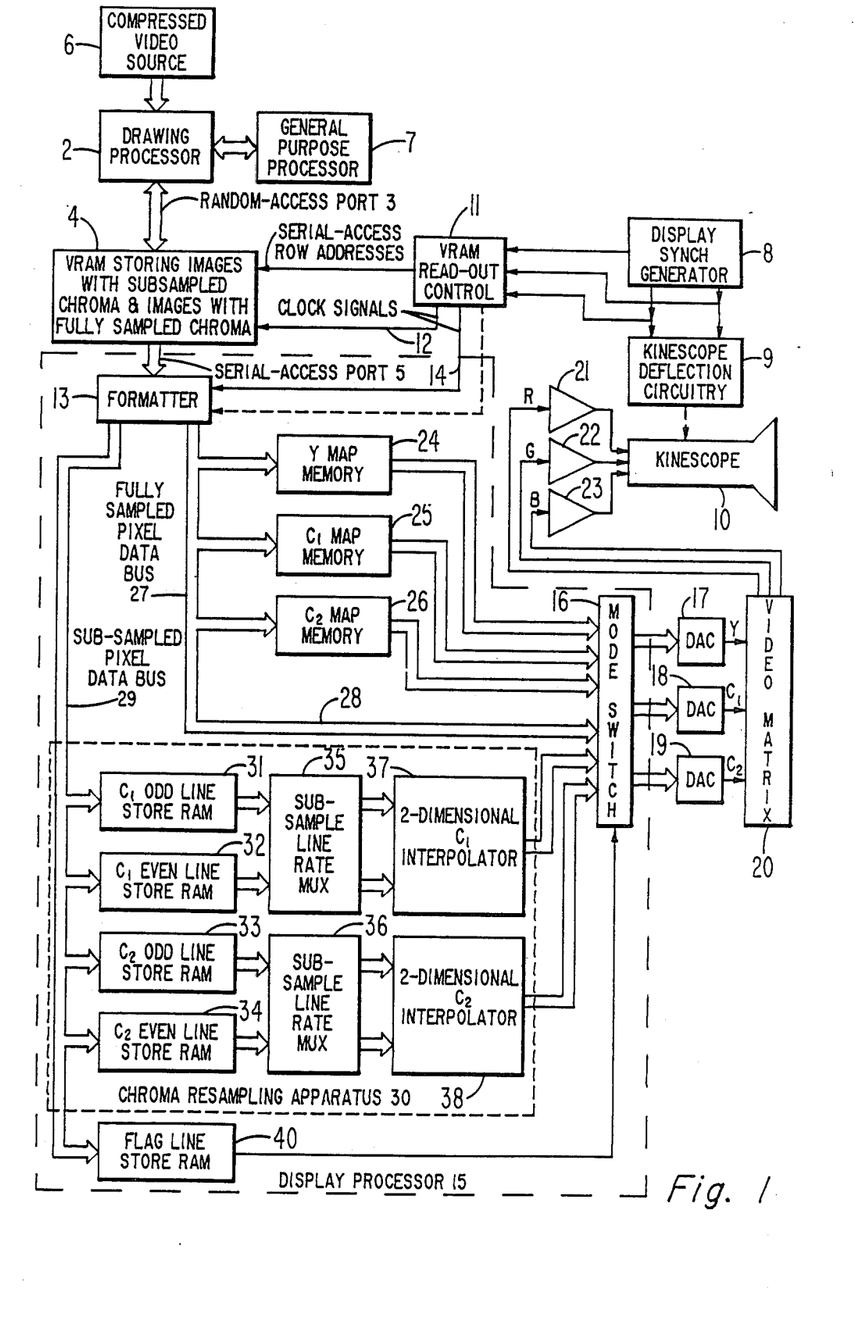
FIG. 1 is a block schematic diagram of a computer graphics system embodying the invention.

In the FIG. 1 computer graphics processor, a drawing processor 2 controls writing into and reading from the random-access port 3 of a video random-access memory, or VRAM 4. VRAM 4 differs from conventional random-access memory, or RAM, in having a serial-access port 5 from which a row of memory data parallelly transferred to an internal buffer can be read serially at high clock rate. (In some VRAM structures data can be serially written into buffer memory via the serial-access port at high clock rate and transferred in parallel into the RAM portion of the VRAM.) Drawing processor 2 accepts compressed video data from a source 6 thereof and subsequently updates images stored in VRAM 4 in accordance with the instructions contained in that compressed video data. Drawing processor 2 does this updating in a portion of the time that VRAM 4 is available for random-access. In the remaining portion of the time that VRAM 4 is available for random-access, drawing processor 2 permits the interchange of data in either direction between VRAM 4 and a general purpose processor 7. That is, in addition to portions of VRAM 4 serving as the image memory for graphics, other portions of VRAM 4 are available for other computer memory functions.

VRAM 4 also is used to store higher-level operating instructions for drawing processor 2, which are programmed using general purpose processor 7 or from header information in the compressed video supplied from source 2. These higher-level operating instructions augment fundamental operating instructions stored in an instruction list within the drawing processor 2 itself. These fundamental, lower-level operating instructions for drawing processor 2 permit initial operation so higher-level instructions can be entered into VRAM 4.

A display synchronization signal generator 8 furnishes horizontal and vertical synchronizing signals to kinescope deflection circuitry 9, which controls the path of beam trace across the display screen of a kinescope 10 on which the computer graphics are to be displayed. These and other synchronizing signals are supplied by generator 8 to VRAM read-out control circuitry 11. Control circuitry 11, which has been incorporated in the same monolithic integrated circuit as drawing processor 2, includes a set of row counters for generating row addresses controlling the loading of rows of image data from the RAM portion of VRAM 4 into the buffer from which serial output is taken via serial access port 5. Control circuitry also supplies read-out clock signals via a connection 12 to VRAM 4 for clocking the selected row of image data serially through the serial-access port 5.

A formatter 13 accepts read-out from VRAM 4 which is a standard number (e.g., thirty-two) of bits wide and parses it into individual pixel data. Control circuitry 11 supplies a clock signal via connection 14 for formatter 7 output signal and also supplies control signals to control parsing into individual pixel data. Formatter 13 is the input stage of a display processor 15 including a mode switch 16 for selecting one of two sets of display information as its output signal. Each of these sets of information comprises a digitized luminance, or Y, signal and two digitized chrominance, or $C_1$ and $C_2$, signals. The selected set is supplied by mode switch 16 to digital-to-analog converters 17, 18 and 19 to generate an analog Y signal, an analog $C_1$ signal and an analog $C_2$ signal respectively. The analog Y, $C_1$ and $C_2$ signals are supplied to a video matrixing circuit 20 which linearly combines them to generate red (R), green (G) and blue (B) color component signals. Video amplifiers 21, 22 and 23 respond to these R, G and B signals to apply drive signals to kinescope 10 controlling the color and intensity of the raster-scanned display.

Map memories 24, 25 and 26 are included in the display processor 15 for storing digital values of Y, $C_1$ and $C_2$ respectively. Map memories 24, 25 and 26 generate the first of the two sets of Y, $C_1$ and $C_2$ signals between which mode switch 16 selects. This first set of Y, $C_1$ and $C_2$ signals is generated responsive to read addresses supplied from formatter 13 at full pixel scan rate in real time during kinescope 10 line trace intervals. Map memories 24, 25 and 26 may be read-only memories (ROMs), programmable read-only memories (PROMs), or RAMs operated as ROMs. The latter choice is usually the most practical in terms of flexibility in graphics processing. The RAMs may be re-programmed during display retrace intervals, down-loading from VRAM 4 through formatter 13, to implement an adaptive pixel coding scheme.

Display processor 15 includes a chroma resampling apparatus 30 for generating the second set of Y, $C_1$ and $C_2$ digitized signals that the mode switch 16 may select. The Y component of this second set of digitized signals is supplied mode switch 16 from VRAM 4 via formatter 13 in real time during line trace intervals. Supplying of the Y signal to mode switch 16 is shown being done directly from formatter 13 via digital bus 28, but may be done instead through a second map memory for Y signal values. The $C_1$ and $C_2$ components of this second set of digitized signals that ar supplied to mode switch 16 is generated in chroma resampling apparatus 30, by interpolating from time-compressed digital signals supplied from VRAM 4 via formatter 13 during selected line retrace intervals. Suppose both $C_1$ and $C_2$ are sampled less densely than Y by a factor of $2^n:1$ in both the direction of line scan and the direction perpendicular thereto, n being a positive integer at least two. Odd-numbered lines of $C_1$ and $C_2$ in the subsampled raster scan are written into line store RAMs 31 and 32 in line retrace intervals immediately flanking the first active display line trace interval and every $2^{(n+1)}$th display line retrace interval thereafter in each display frame. Even-numbered lines of $C_1$ and $C_2$ are written into line store RAMs 33 and 34 in line retrace intervals immediately flanking the (2n+1)th active display line trace interval and every $2^{(n+1)}$th display line trace interval thereafter in each display frame.

Each of the RAMs 31-34 is read at $2^{-n}$ times pixel scan rate during each line trace interval. A multiplexer 35 permutes the outputs of $C_1$ line store RAMs 31 and 33 at subsampled chrominance scan line rate to supply a two-dimensional interpolator 37 with two adjacent scan lines of chrominance subsamples. Interpolator 37 performs a bilinear interpolation between successive sets of four samples supplied to its inputs to generate a digitized $C_1$ signal at its output that is sampled at the same density as the digitized Y signals supplied with it to mode switch 16. A multiplexer 36 permutes the outputs of $C_2$ line store RAMs 32 and 34 at subsampled chrominance scan line rate to supply a two-dimensional interpolator 38 two adjacent scan lines of chrominance subsamples. Interpolator 38 performs a bilinear interpolation between successive sets of four samples supplied to its input to generate a digitized $C_2$ signal at its output that is sampled at the same density as the digitized $C_1$ and Y signals supplied with it to mode switch 16. (Bilinear interpolation is an interpolative process separable into consecutive linear interpolations in each of two mutually orthogonal dimensions.) Reading out from RAMs 31-34 is preferably started enough before line trace interval to compensate for the delay introduced into the resampled $C_1$ and $C_2$ signals by interpolators 37 and 38 respectively.

The system as thusfar described is essentially the same as that described by D. L. Sprague et al. in U.S. Pat. No. 4,740,832, filed Oct. 14, 1986 entitled "IMAGE STORAGE USING SEPARATELY SCANNED LUMINANCE AND CHROMINANCE VARIABLES" and assigned to RCA Corporation. The invention concerns how to control mode switch 16 selecting between the first and second sets of Y, $C_1$ and $C_2$ digital data it is supplied with. An underlying precept of the invention is to provide the mode flag information (or F signal) at a spatial subsampling density substantially less dense than spatial sampling density for the luminance component of video. The spatial subsampling density for the F signal may the same as that for the $C_1$ and $C_2$ signals, or it may be even less dense. The subsampling of the F signal as compared to the Y signal describing the luminance component of the video reduces the amount of memory taken up by the F signal in the VRAM 4.

The storing of mode switching flag information in bit-map organization in VRAM, albeit in a less densely sampled bit-map organization, provides for rapid switching between display modes using simple decoding procedures. Only one bit needs be decoded to switch between two display modes. Where a small number m of display modes are to be selected from, only $log_2 m$ bits need to be decoded at pixel scan rate. There is no need for repetitive multi-bit comparisons as are required in schemes where mode switching is controlled by run-length codes.

In FIG. 1 a flag line store RAM 40 is loaded with a line of subsampled F signal every $p^{th}$ line retrace interval and is read out iteratively at pixel scan rate divided by q during the following p line trace intervals. That is, the F signal is subsampled p times less densely than Y signal in the direction perpendicular to line scan and is subsampled q times less densely than Y signal in the direction parallel to line scan. RAM 40 read-out is supplied with an output latch (not specifically shown) to control which set of input signals mode switch 16 selects as input signals to digital-to-analog converters 17–19.

A one-bit F signal from RAM 41 suffices to control mode switch 16 in selecting between two sets of Y, $C_1$ and $C_2$ signals. By way of example, assume mode switch 16 responds to a ZERO-valued F signal by selecting real-time Y signal from VRAM 4 and resampled $C_1$ and $C_2$ signals from interpolators 37 and 38 to be supplied as input signals to digital-to-analog converters 17–19. Mode switch 16 responds to a ONE-valued F signal from RAM 41, then, by selecting Y, $C_l$ and $C_2$ output signals from map memories 24–26 to be supplied as input signals to converters 17–19.

Figure 2:
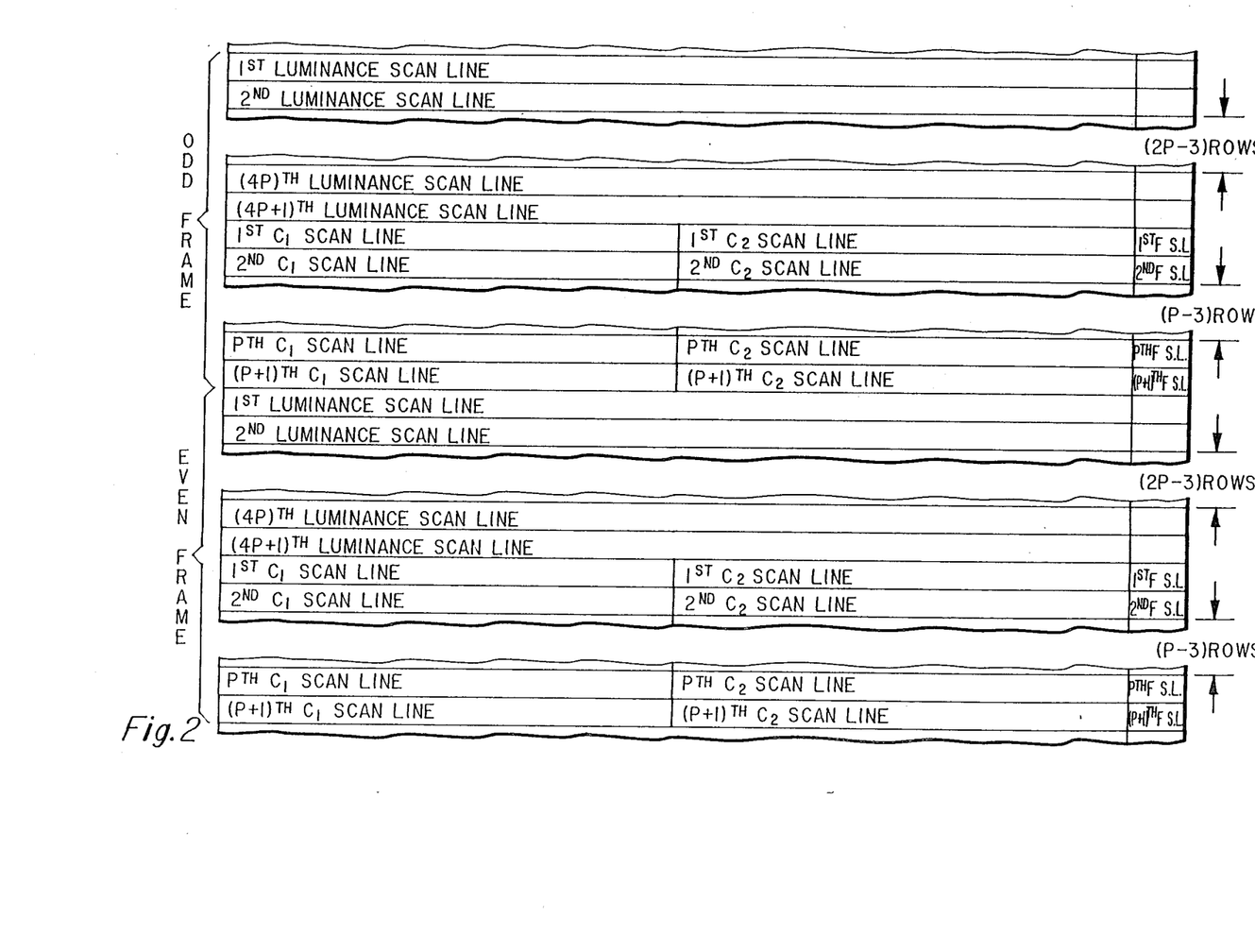
FIG. 2 is a diagram showing how one may arrange to store, in the video random-access memory of the FIG. 1 system, two frames of video information in which chrominance is subsampled respective to full display resolution.

FIG. 2 shows how one may store in VRAM 4 two frames of video information in which chrominance information and priority information are subsampled respective to luminance information. Here, F, $C_1$ and $C_2$ are each subsampled 2:1 in the direction of line trace and 2:1 in the direction perpendicular to line trace.

So, there are about one half as many F signal scan lines and about one half as many chrominance scan lines as luminance scan lines. More particularly, if there are a number (p+1) of chrominance scan lines, p being a positive integer, there are 2p+1 luminance scan lines. These are active scan lines and p is usually about 120 or 240 where kinescope 10 is in a conventional monitor.

The luminance samples in each of the two frames are arranged in respective bit-map-organizations in successive respective rows of VRAM 4. The number of luminance pixels times the number of bits per Y value for a luminance pixel is shown as being somewhat short of filling a row of VRAM 4. The lines of luminance samples are successively parallelly transferred to the parallel-to-serial buffering in VRAM 4 during successive line retrace intervals and transferred out of VRAM 4 serial output port 5 one at a time in real time during line trace intervals.

In each of the two frames the $C_1$, $C_2$ and F signals are interleaved line by line and stored in bit-map-organizations in successive rows of VRAM 4, separate from the luminance bit-map-organizations.

$C_1$ and $C_2$ have as many bits per sample as Y-e.g., eight. So, each scan line in chrominance ($C_1$ or $C_2$) is one half as long in terms of numbers of bits as each scan line in luminance (Y). F signal, having only one bit per sampled one-quarter as densely as Y signal in the direction of scan lies, has only one-sixteenth as many samples per scan line as Y signal. One scan line each of the $C_1$, $C_2$ and F signals fit within a row of VRAM 4.

In actual practice 4:1 subsampling of $C_1$, $C_2$ and F signals in both horizontal and vertical directions is preferred. (This practice is not illustrated by drawing since it is difficult to illustrate within the space constraints in the drawing.) In such case, two scan lines of $C_1$, $C_2$ and F signals may be fitted within a row of VRAM; and the value of p is reduced, to a value usually about 60 or 120 when kinescope 10 is in a conventional monitor. The parallel to serial buffering in VRAM 4 allows serial read-out through serial-access port 5 to proceed from any column address, and only that portion of VRAM 4 row including $C_1$ signal, $C_2$ signal and F signal scan lines of interest are read out during a selected line trace interval or selected line trace intervals, to write chroma line store RAMs 31 and 32 (or 33 and 34) and flag lines store after parsing into individual pixels in formatter 13. Except for the inclusion of F signal information this operation is similar to that described by Sprague et al. in U.S. Pat. No. 4,740,832.

A number of variants of the VRAM packing shown in FIG. 2 are possible. For example, the interleaving of lines of F, $C_1$ and $C_2$ data may not be used; and instead the bit-map organizations of F, $C_1$ and $C_2$ may be in separate sets of VRAM rows.

Figure 3:
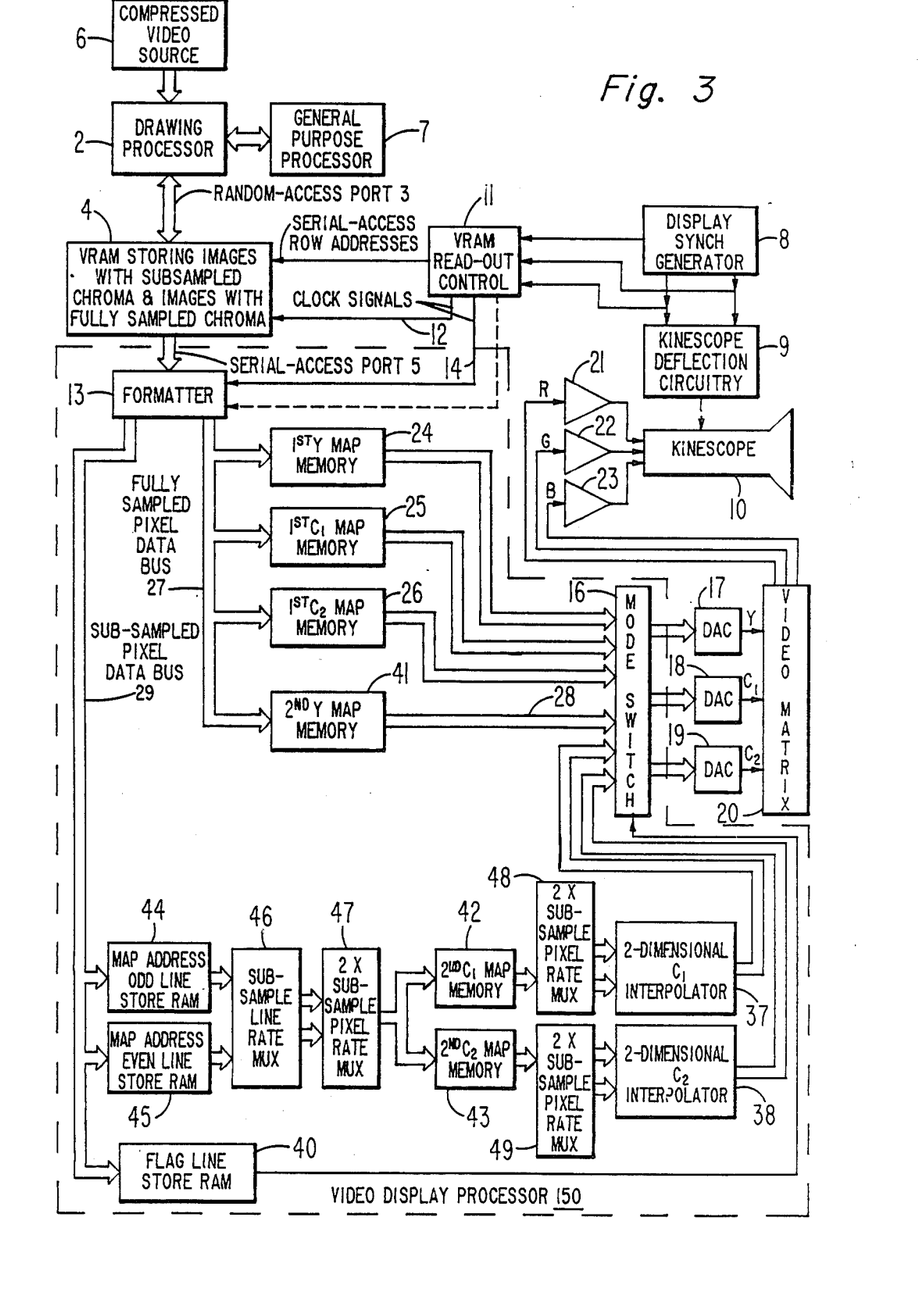
FIG. 3 is a block schematic diagram of another computer graphics system embodying the invention.

FIG. 3 shows a computer graphics system with a video display processor 150 that differs from that of the FIG. 1 computer graphics system. As in the FIG. 1 system, in one mode of operation map memories 24, 25 and 26 are retained as first Y map memory, first $C_1$ map memory and first $C_2$ map memory. Memories 24, 25 and 26 are addressed at full display resolution to generate digital Y, $C_1$ and $C_2$ signals for application to digital-to-analog converters 17, 18 and 19 respectively. In the other mode of operation, the FIG. 3 system differs from the FIG. 1 system. A second color map mode is employed in which a second Y map memory 41 is addressed at a sampling rate corresponding to full display resolution, and in which a second $C_1$ map memory 42 and a second $C_2$ map memory 43 are addressed at a subsampling rate corresponding to a reduced display resolution. During line trace intervals the second Y map memory 41 is supplied via data bus 27 at the sampling rate corresponding to full display resolution.

During selected line retrace intervals subsampled F signal data is loaded a line at a time into flag line store RAM 40 as in the FIG. 1 computer graphics system. Rather than having to store lines of subsampled $C_1$ and $C_2$ data in RAMs 31–34, lines of subsampled color map address information are stored in line store memories 44 and 45 instead. Line store memory 44, shown as a RAM, stores odd lines of subsampled color map address information. Line store memory 45, shown as a RAM stores even lines of subsampled color map address information.

During line trace intervals, F signal data are read-out of flag line store RAM 40 as in the FIG. 1 to control mode switch 16. Subsampled color map address information is read out from RAMs 44 and 45 at subsampled pixel scan rate. A multiplexer 46 permutes the order of the scan lines of subsampled color map address information at subsample scan rate to supply upper and lower lines of subsampled color map address information. These lines of subsampled color map address information are converted each to respective lines of subsampled $C_1$ and $C_2$ signals using the second $C_1$ map memory 42 and the second $C_2$ map memory 43 on a time-division-multiplex basis. Time-division multiplexing avoids the need for duplicating map memories 42 and 43 for the odd and even subsample lines. This time-division multiplexing is done using multiplexers 47–49 switching at twice the subsampling rate in the direction of line scan. The upper and lower lines of subsampled $C_1$ signal are supplied to the interpolator 37; and the upper and lower lines of subsampled $C_2$ signal are supplied to the interpolator 38. As in the FIG. 1 system, interpolators 37 and 38 supply to mode switch 16 $C_1$ and $C_2$ signals sampled at a rate corresponding to full display resolution.

Figure 4:
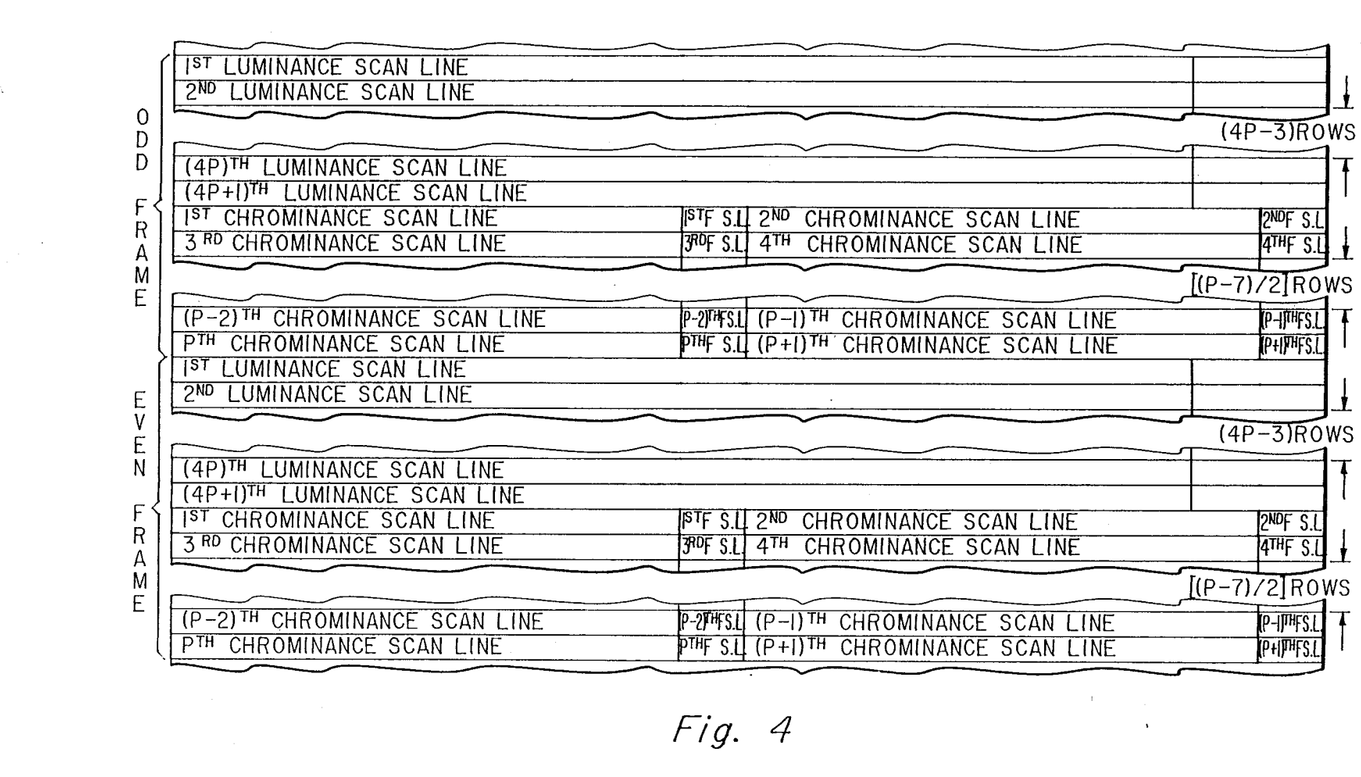
FIG. 4 is a diagram showing how one may arrange to store, in the video random-access memory of the FIG. 3 system, two frames of video information in which color map addressing is subsampled respective to full display resolution.

FIG. 4 shows how one may store in VRAM 4 two frames of video information in which color map addressing information and priority information are subsampled. Here, F signal and the addressing for color map memories 42 and 43 are each subsampled at the same density respective to the addressing for Y map memory 41, one quarter so densely in both the direction parallel to scan lines and the direction perpendicular to scan lines. Both sets of map memory addresses are assumed to have the same number of bits e.g., eight. The number of memory 41 addresses per scan line times the number of bits per address is shown as being somewhat short of filling a row of VRAM 4, and four lines of memories 42 and 43 addressing plus four lines of F signal are shown as exactly filling a row of VRAM 4.

Figure 5:
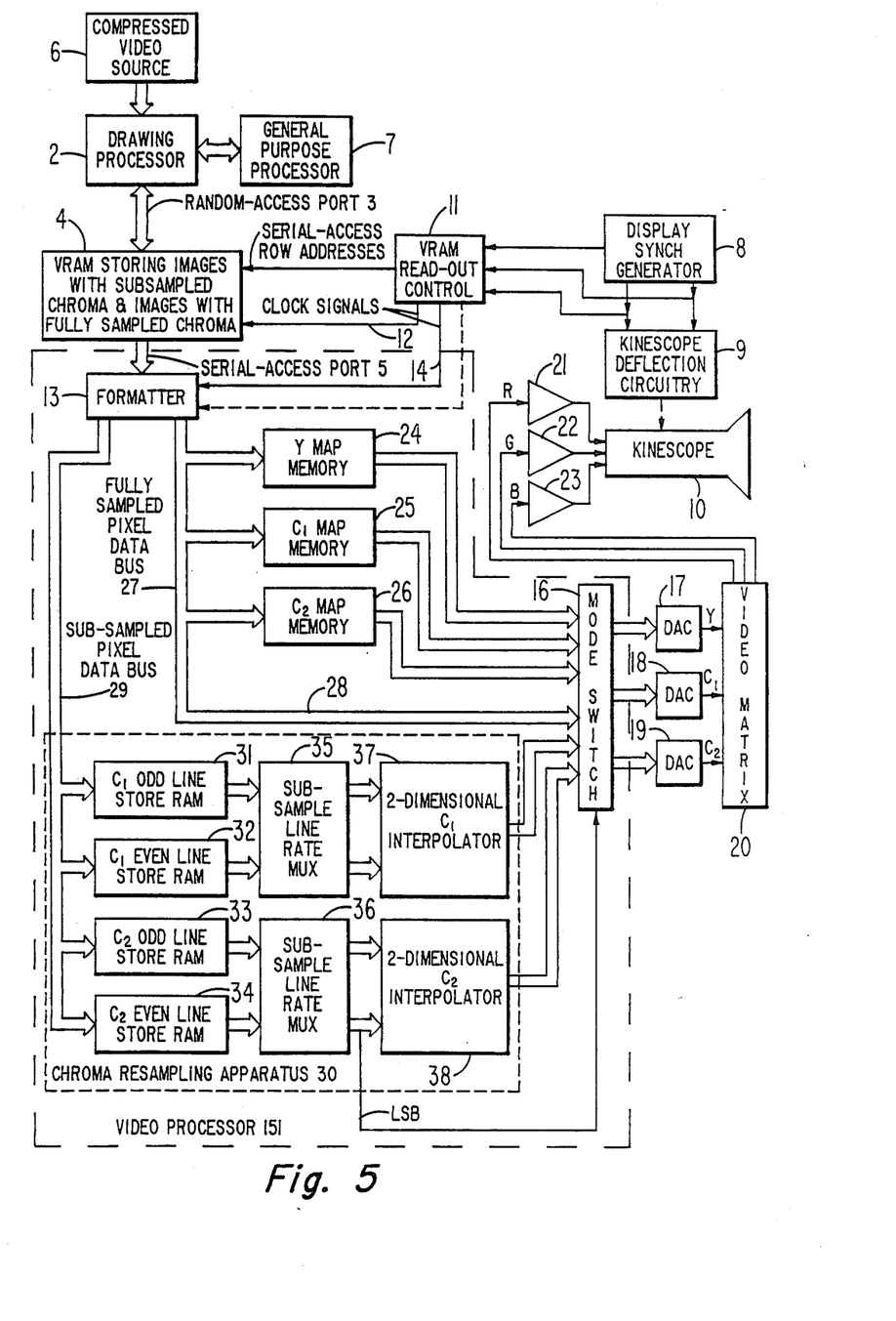
FIG. 5 is a block schematic diagram of a variant of the FIG. 1 computer graphics system.

FIG. 5 shows a variant of the FIG. 1 graphics system that can be used if $C_1$ and $C_2$ are properly chosen and if the subsampling of F signal is the same as that of the $C_1$ and $C_2$ signals. $C_1$ and $C_2$ are chosen in such a way that the toggling of the least significant bit of $C_2$ results in imperceptible color change in the display on kinescope 10. This has been determined to be the case for $C_1$ and $C_2$ being eight-bit descriptions of I and Q color-difference signals as used in NTSC color television broadcasting. This allows the least significant bit of $C_2$ to be supplied to a mode flag delay circuit 39 the output of which controls the state of selection in mode switch 16. In somewhat oversimplified terms, operation is as follows. When one wishes to write on kinescope 10 screen using the subsampled-chrominance operational mode, rather than the map-memory look-up mode, the least significant bit of $C_2$ is forced to be a ZERO. When one wishes to write on kinescope 10 screen using the map-memory look-up mode, $C_2$ is forced to be a ONE.

The choice of bit condition to flag each operational mode is largely arbitrary, but the choice indicated is advantageous in that white purity is determined solely by luminance (or Y) signal if the flag bits are admitted into interpolator 38. One may alternatively choose not to admit the least significant bit in each of the $C_2$ value applied pairwise to interpolator 38. If one does not apply the flag bits to interpolator 38, then which bit place the flag bit accompanying $C_2$ appears in is not important. It may be in the most significant bit place, with $C_2$ being halved in amplitude in the digital code outputs of RAMs 32 and 34, for example. $C_2$ values are then multiplied by two in simple bit place shifts before interpolator 38.

Suppose the output of multiplexer 36, a bit of which is used as flag signal to control mode switch 16, sends interpolator 38 a scan line of samples that is earlier in the display raster scan than the scan line of samples the other output of multiplexer 36 sends to interpolator 38. The flag bit that indicates display mode is switched to using interpolators 37 and 38 will be included in the scan line where the mode switch is to occur. During the reading out of that line from one of the line store RAMs 33 and 34 and during the succeeding lines (e.g., the next three) the contents of those RAMs are re-read, the flag bit condition will switch the display mode in the same way.

On the other hand, suppose the flag bit is drawn from the scan line of samples that is later in the display scan. The flag bit that indicates display mode is switched will be included in the scan line next after the scan line where the mode switch is to occur.

When more than two display modes are to be switched among, in other embodiments of the invention the flag data can be encoded in a plurality of bits and subsampled in image memory.

There are other embodiments of the invention, which use respective dedicated memories for storing picture element variables in bit-map organizations in each of the plurality of formats available for display, and which use a dedicated memory for storing flag data in a bit-map organization that subsamples the bit-map organizations of picture element variables. The bit-map organizations are simultaneously raster scanned at their respective sampling densities. The sparsely sampled flag data are used to control display mode switching.

I claim:

1. Apparatus for storing descriptions of images in a plurality of coding formats and generating digitized video signals descriptive of raster scanned display, said apparatus comprising:

memory means for storing in a first bit-map organization samples of images fields described in a first coding format at a first sampling density, and for storing in a second bit-map organization samples of image fields described in a second coding format at a second sampling density, and for storing in a third bit-map organization samples concerning which coding format is to be used in various portions of said raster scanned display, those samples having a third sampling density sparser than at least the first of said first and second sampling densities;

a display processor for simultaneously providing, in raster scan format, samples from said first, second and third bit-map organizations and including first means receptive of samples from said first bit-map for providing decoded samples, and including second means receptive of samples from said second bit-map for providing component video samples at the same sampling density as samples from said bit-map; and means responsive to samples from said third bit-map organization in raster scan format, for selecting either decoded samples from said first means or component video samples from said second means and samples from said first bit-map organization.

2. Apparatus as set forth in claim 1 wherein said first and second sampling densities are alike.

3. Apparatus as set forth in claim 1 wherein said second and third sampling densities are alike.

4. Apparatus for storing descriptions of images in commingled signal formats and retrieving them to generate digitized video signals descriptive of a raster-scanned display, said apparatus comprising:

a random-access memory for storing in a first bit-map organization samples of image fields at a first sampling density and for storing in a second bit-map organization indications of which of a plurality of coding standards different ones of these samples are expressed in, said indications being stored at a second sampling density sparser than said first sampling density;

means for raster scanning the storage locations in said first bit-map organization in said random-access memory while reading samples of image fields therefrom during line trace intervals in said raster scanned display;

means for raster scanning the storage locations in said second bit-map organization in said random-access memory while reading coding standard indications therefrom during line retrace intervals in said raster scanned display;

a display processor receptive of the samples of image fields and coding standard indications read from said random-access memory;

apparatus within said display processor for resampling said indications of coding standards to occur during in the trace intervals; and apparatus within said display processor for decoding said samples of image fields in accordance with the coding standards specified by said resampled indications of coding standards, thereby to generate digitized video signal samples.

5. Apparatus as set forth in claim 4 wherein at least one of said coding standards provides for image fields to be encoded as a first set of samples of said first sampling density and as at least second and third further sets of samples at another sampling density sparser than said first sampling density, wherein said random-access memory stores in respective bit-map organizations each said further set of samples at another sampling density, wherein there is included means for raster scanning the storage locations in each said further bit-map organization in said random-access memory while reading from that memory samples of image fields in said further set during line retrace intervals in said raster scanned display, and wherein said display processor includes apparatus for resampling each of said further set of samples to said first sampling density through interpolative procedures and for aligning the resampling data with said first set of samples, and wherein the aligned resampled data are combined with said first set of samples to generate three component color signals.

6. Apparatus as set forth in claim 5 wherein said other sampling density of said further sets of samples is the same as said second sampling density.

7. Apparatus as set forth in claim 6, wherein said indications of coding standards are stored in the same random-access memory locations as said second set of samples of image fields, and wherein said means for raster scanning storage locations in said second bit-map organization is also the means for raster scanning storage locations in the bit-map organization for said second set of samples.

8. Apparatus as set forth in claim 4 wherein at least one of said coding standards provides for image fields to be encoded as a first set of samples of said first sampling density and as a second set of samples at another sampling density sparser than said first sampling density, wherein said random-access memory stores said second set of samples in a third bit-map organization, wherein there is included means for raster scanning the storag locations said third bit-map organization in said random-access memory while reading from that memory samples of image fields in said second set during line retrace intervals in said raster scanned display, wherein the second set of samples read from said random-access memory are applied as read addresses to a color map memory for generating at least third and fourth sets of samples at said other sampling density, and wherein said display processor includes apparatus for resampling each of said further set of samples to said first sampling density through interpolative procedures and for aligning the resampling data with said first set of samples, and wherein the aligned resampled data are combined with said first set of samples to generate three component color signals 9. Apparatus as set forth in claim 8 wherein said other sampling density of said further sets of samples is the same as said second sampling density.

10. Apparatus as set forth in claim 9, wherein said indications of coding standards are stored in the same random-access memory locations as said second set of samples of image fields, and wherein said means for raster scanning storage locations in said second bit-map organization is also the means for raster scanning storage locations in the bit-map organization for said second set of samples.

11. Apparatus for storing and retrieving descriptions of images in commingled video signal formats, a first of said formats having luminance and chrominance components respectively sampled relatively densely and relatively sparsely and the second of said formats having luminance and chrominance components both sampled at a density greater than that of each chrominance component in said first format, said apparatus comprising:

a random-access memory for supplying relatively sparse samples of the image field during selected line retrace intervals in time-advanced and time-compressed form and for supplying denser samples of the image field in real time during each line trace interval, said denser samples corresponding to the luminance component of portions of images coded in said first format and corresponding to the combined luminance and chrominance components of portions of images coded in said second format, those of said relatively sparse samples of the image field applied during line retrace interval that are descriptive of portions of images coded in said first format being descriptive of chrominance components thereof, and those of said relatively sparse samples of the image field supplied during line retrace interval that are descriptive of portions of images described in said second format including coded mode flag information;

means, responsive to said denser samples of the image field supplied in real time during each line trace interval, for generating a first set of color signals, which accurately describes portions of images coded in said first format;

means, responsive to said denser samples of the image field supplied in real time during each line trace interval, for generating a luminance signal that accurately describes portions of images coded in said second format;

means for retrieving said relatively sparse samples of the image field supplied during selected line trace intervals in time-advanced and time-compressed form to put them in prescribed temporal alignment with periodically selected ones of said denser samples;

means interpolating from the temporally aligned relatively sparse samples for generating a pair of chrominance signals that accurately describe portions of images coded in said second format;

means for combining said luminance signal and said pair of chrominance signals, each of which accurately describes portions of images coded in said second format, for generating a second set of color signals, which accurately describes portions of images coded in said second format;

means responding to said temporally aligned relatively sparse samples having mode flag information encoded therein for generating a control signal; and a color signal selector switch responsive to said control signal for selecting between said first and second sets of color signals to supply continuously accurate descriptions of images.

12. Apparatus as set forth in claim 11 wherein said means for generating a first set of color signals comprises at least one map memory receptive of said denser samples as read addressing.

13. Apparatus as set forth in claim 11 wherein said temporally aligned sparse samples are arranged in at least a first steam of samples, one bit of which encoded said mode flag information, and wherein said means for generating a control signal extracts that bit which encodes said mode flag information, to be used as control signal for said color signal selector switch.

14. Apparatus as set forth in claim 13 wherein said temporally aligned sparse samples are arranged in first and second streams of samples, the samples in second stream corresponding to in-phase chrominance samples and the samples in said first stream corresponding to quadrature chrominance samples each augmented by an additional mode flag bit.

15. Apparatus for storing and retrieving descriptions of images in commingled video signal formats, a first of said formats having luminance and chrominance components respectively sampled relatively densely and relatively sparsely and the second of said formats having luminance and chrominance components both sampled at a density greater than that of each chrominance component in said first format, said apparatus comprising:

a random-access memory for supplying relatively sparse samples of the image field during selected line retrace intervals in time-advanced and time-compressed form and for supplying denser samples of the image field in real time during each line trace interval, said denser samples corresponding to the luminance component of portions of images coded in said first format and corresponding to the combined luminance and chrominance components of portions of images coded in said second format, those of said relatively sparse samples of the image field applied during line retrace interval that are descriptive of portions of images coded in said first format being descriptive of chrominance components thereof, and those of said relatively sparse samples of the image field supplied during line retrace interval that are descriptive of portions of images described in said second format including coded mode flag information;

means, responsive to said denser samples of the image field supplied in real time during each line trace interval, for generating a first set of color signals, which accurately describes portions of images coded in said first format;

means, responsive to said denser samples of the image field supplied in real time during each line trace interval, for generating a luminance signal that accurately describes portions of images coded in said second format;

means for retrieving said relatively sparse samples of the image field supplied during selected line trace intervals in time-advanced and time-compressed form to put them in prescribed terporal alignment with periodically selected ones of said denser samples;

first and second map memories receiving at least portions of said temporally aligned samples as read addresses and supplying a pair of subsampled chrominance signals that accurately describe portions of images coded in said second format;

means for interpolating from said pair of subsampled chrominance signals for generating a pair of chrominance signals of the same sampling density as said denser samples, which accurately describe portions of images coded in said second format;

means combining the pair of chrominance samples generated by interpolation and said luminance signal, each of each accurately describes portions of images in said second format, for generating a second set of color signals, which accurately describes portions of images coded in said second format;

means responding to said terporally aligned relatively sparse samples having mode flag information encoded therein for generating a control signal, and a color signal selector switch responsive to said control signal for selecting between said first and second sets of color signals to supply continuously accurate descriptions of images.

16. Apparatus as set forth in claim 15 wherein said means for generating a luminance signal that accurately describes portions of images coded in said second format comprises;

a third map memory, receiving said denser samples of the image field supplied in real time during each line trace interval, and supplying said luminance signal that accurately describes portions of images coded in said second format.

17. Apparatus as set forth in claim 16 wherein said means for generating a first set of color signals comprises at least one map memory receptive of said denser samples as read addressing.

18. Apparatus as set forth in claim 15 wherein said means for generating a first set of color signals comprises at least one map memory receptive of said denser samples as read addressing.

19. Apparatus as set forth in claim 15 wherein said temporally aligned sparse samples are arranged in at least a first steam of samples, one bit of which encoded said mode flag information, and wherein said means for generating a control signal extracts that bit which encodes said mode flag information, to be used as control signal for said color signal selector switch.

* * * * *